United States Patent
Rodgers

[11] 3,853,478
[45] Dec. 10, 1974

[54] SOLUTE METERING APPARATUS
[75] Inventor: Franklin A. Rodgers, Brookline, Mass.
[73] Assignee: Pactide Corporation, Dover, Del.
[22] Filed: Dec. 22, 1972
[21] Appl. No.: 317,653

[52] U.S. Cl............. 23/267 R, 23/272.8, 210/321, 210/22, 137/268, 222/490, 222/85, 222/189
[51] Int. Cl...... B01d 11/02, B01d 13/00, B01f 1/00
[58] Field of Search............ 23/267 R, 272.7, 272.8, 23/267 E; 210/321, 456, 130, 22; 137/268; 222/85, 189, 490

[56] References Cited
UNITED STATES PATENTS

| | | | |
|---|---|---|---|
| 2,568,332 | 9/1951 | Genovese | 23/267 R |
| 2,614,574 | 10/1952 | Farrell | 23/267 R |
| 3,468,796 | 9/1969 | Noll | 210/22 |
| 3,670,897 | 6/1972 | Frank | 210/22 |

OTHER PUBLICATIONS
Perry, Chemical Engineer's Handbook, 1958, pages 1296–1297.

Primary Examiner—Norman Yudkoff
Assistant Examiner—S. J. Emery
Attorney, Agent, or Firm—Michael Bard

[57] ABSTRACT

Apparatus for and method of feeding a solute into a stream of solvent at an accurately predetermined and variable rate. A solute such as an acid for treating water to prevent scale formation is disposed in a container in solid form.

The interior of the container communicates with a supply of heated and deaerated distilland via a conduit blocked by a predetermined variable area microporous membrane.

The heated and deaerated distilland is circulated in contact with one side of the membrane and diffuses therethrough whereby the solute dissolves therein to form a concentrated aqueous acid solution. The concentrated acid solution is permitted to diffuse back through the membrane and mix with the distilland to control the pH thereof. The solute concentration within the acid solution in the container is maintained generally constant and means are provided for indicating a change in solute concentration.

10 Claims, 9 Drawing Figures

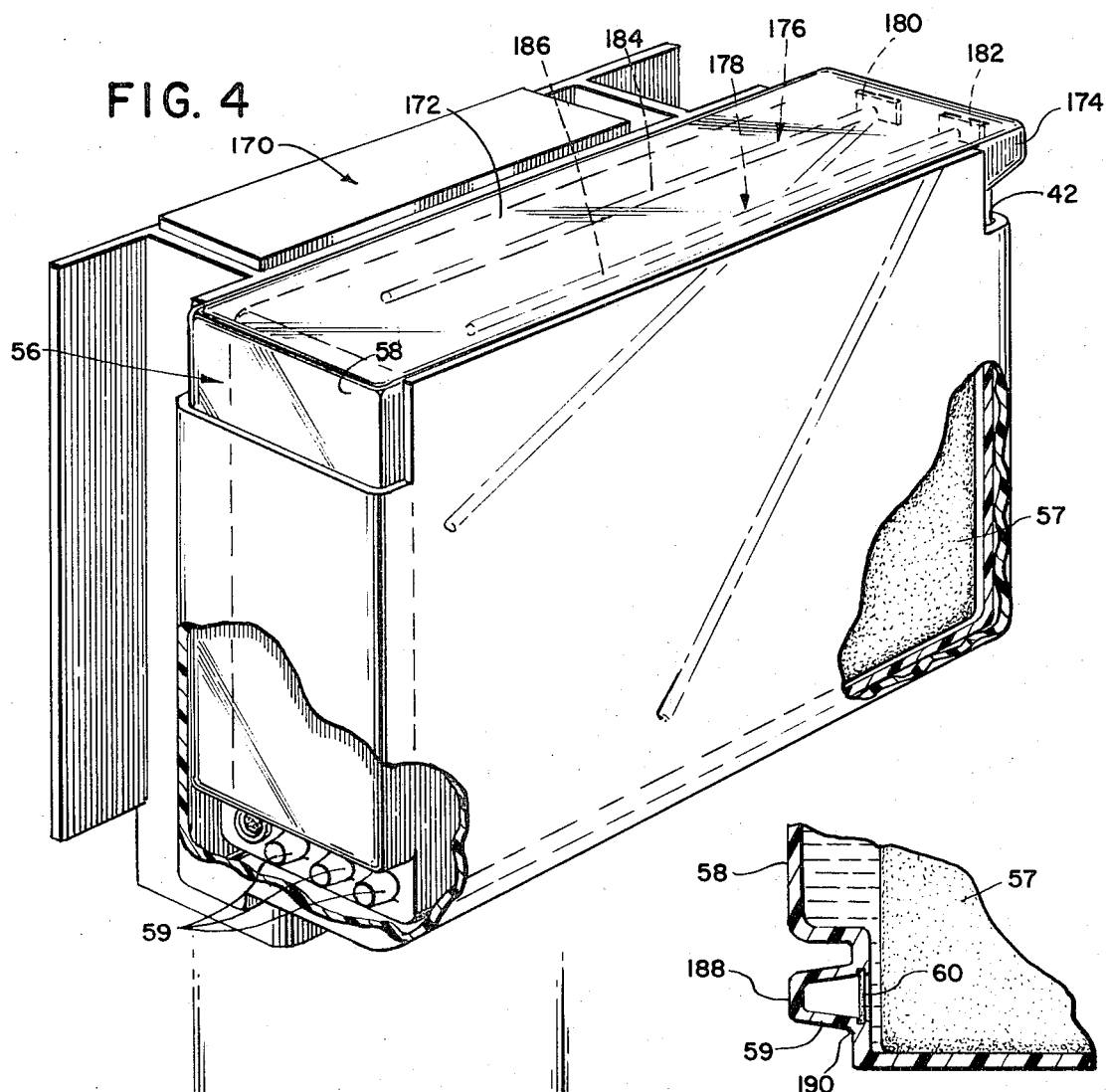

SOLUTE METERING APPARATUS

BACKGROUND OF THE INVENTION

This invention relates generally to novel and improved distillation apparatus and method for transferring liquid directly from one body of liquid to another across a vapor permeable barrier and, more particularly, to a solute feeding apparatus and method for conditioning the distilland liquid.

In my copending U.S. Pat. application Ser. No. 317,623, filed on even date herewith there is described a distillation system particularly adapted for distilling potable water from brackish water and including as a basic component thereof a still having a microporous membrane that operates as a barrier to liquids while readily passing the vapors of the liquids; means for forming thin evaporating and condensing layers of the liquids in contact with opposite sides of the microporous membrane; and means for transferring heat to the evaporating layer and from the condensing layer.

The microporous membrane includes a multiplicity of microscopic gas-filled through passages having walls non-wettable by the liquid for passing substantially only the vapor of the liquid from the evaporating layer to the condensing layer.

The porous membrane and the means for forming the evaporating and condensing layers preferably constitute one liquid transfer stage of a multiple-stage still in which adjacent condensing and evaporating layers of adjacent stages are separated by liquid and vapor impermeable barriers, and heat is transferred from the condensing layer of each stage to the evaporating layer of the next succeeding stage.

In the system which is the subject of copending application Ser. No. 317,623, aforesaid, cold tap water is passed through a multi-stage still of the type described hereinabove and functions to cool the distillate. This cold water is then conducted to a combination boiler-deaeration device where it is heated and deaerated and then sent through the still as the feed or distilland liquid.

It has been found that where the tap water is high in polycarbonate content, the heating and deaeration thereof will effect scale formation in the combination boiler-deaerator (and elsewhere in the system) with an attendant loss of efficiency and other undesirable qualities. It has been found that treating the boiled and deaerated feed water in the combination boiler-deaerator to control the pH of the heated water will prevent such scale formation.

In order to provide treatment of the heated distilland as aforesaid, numerous proposals have been made for feeding solutes in gaseous, liquid, or solid form at a controlled rate into a stream of a liquid solvent. These systems basically comprise means for feeding the solute, the structure of which depends on the physical nature of the solute, i.e., gas, liquid, or solid, and metering means for controlling the rate of solute feed by the feeding means relative to the solvent stream flow. In the case of liquid and gaseous solutes, such means may be very simple taking the form of a valve for metering the flow of the solute into the solvent stream. In the case of solutes in solid form, the stream (or a portion of the stream) may be caused to flow in contact with the solid solute. Although said solute feed and metering systems of the prior art type described have proven satisfactory for most applications, particularly those involving relatively large flow and metering rates, they are generally complex and expensive and, if not incapable of controlling solute feed at very low rates with a high degree of accuracy, then economically unfeasible for use in a low solvent flow rate application.

In copending application Ser. No. 244,606, filed by Franklin A. Rogers on Apr. 17, 1972, now abandoned, there is described a unique apparatus and method in which a supply of solute in liquid form, either pure or in solution, is maintained in contact with one side of a microporous membrane wettable by the solvent, and the stream of solvent is caused to flow in contact with the other side of the membrane.

The concentration of the solute on the supply side of the membrane is greater than in the solution stream, while the hydrostatic pressures of the two bodies in contact with opposite sides of the membrane differ only slightly, e.g., by a few inches of water. Any pressure differential is maintained so small that the solute and solvent pass through the membrane essentially by diffusion rather than by pressure-induced flow. A solute flow rate thus is a function of the relative concentrations of the two liquid bodies, pore size, and membrane area. Thus, by virtue of the system of the device (described in application Ser. No. 244,606, aforesaid), it is possible to control feed rates at a fraction of a gram per hour with tolerances on the order of five to ten percent.

Nevertheless, in many applications and particularly in the conditioning of tap water for subsequent distillation in a system such as described in copending application Ser. No. 317,623, aforesaid, it is not only desirable to control the rate at which solute may be fed into a solvent, but it is often desirable to be able to provide for varying the rate at which the solute to solvent feed occurs. For example, in those situations where it is desired to treat tap water with a distillation system designed for home use, it is desirable to permit the user the option of controlling the rate of solute to solvent feed as a function of the hardness, for example, of the user's tap water.

SUMMARY OF THE INVENTION

The subject invention provides a method and apparatus for controlling the pH of a distilland liquid to prevent scale formation while the distilland liquid is being heated and deaerated in a combination boiler and deaeration mechanism.

The boiler-deaeration apparatus comprises four chambers for the processing of the distilland liquid and a fifth chamber for receiving a solute container which forms a portion of the subject invention. Cold tap water, as from the cold water line of a common kitchen sink, is fed into the first of said chambers and is permitted to fill said first chamber until it overflows a wall of predetermined height into an overflow chamber which is connected to a drain line of the kitchen sink. Thus, the height of the wall between the first chamber and the over-flow chamber (which comprises the second chamber) establishes the head to which the water may rise in the third and fourth chambers. The third chamber comprises the boiling chamber and is provided with a heating element in its bottom portion in close proximity to which is provided a conduit for carrying cold water from the first chamber to enter the third or boiler chamber. The heated and deaerated water in the third chamber rises and overflows a wall separating the third and fourth chambers, which wall is at the same height as the wall separating the first and second chambers. The fourth chamber is provided with an opening in the lower portion thereof which communicates with the fifth chamber which holds the solute container, aforesaid.

The solute container comprises a generally rectangular parallelepiped-shape unit including lower and cover portions. A plurality of nipple-like protuberances extend outwardly from the base of the lower portion of the solute container, are closed at their ends, and communicate with the interior of the solute container through discrete microporous membranes (which are wettable by the solvent). The solute container is typically filled with a prescribed amount of solute such as citric acid in cake form, and deaerated and heated distilland communicates with the closed nipples by flowing into the fifth chamber through the opening in the fourth chamber in the boiler-deaerator. The user of the distillation system may readily ascertain the rate at which it is desired to add, for example, citric acid, to the heated and deaerated distilland by ascertaining the pH or hardness of the tap water feed. Such a determination of tap water hardness may be readily accomplished via the use of litmus paper or other suitable indicia.

Depending upon the rate at which it is desired to feed solute into the heated and deaerated distilland, the user will snip off the tips of one or more nipples to permit the heated and deaerated distilland to communicate with one side of one or more of the microporous membranes in the solute container. The heated and deaerated distilland will then proceed to diffuse through the microporous membranes in contact therewith to form a citric acid solution in the solute container which, in turn, will diffuse back through the same microporous membrane or membranes to control the pH of the distilland in the fourth chamber of the boiler-deaerator.

The greater the number of nipples opened by the user, the greater will be the rate at which the citric acid will be permitted to diffuse into the distilland and the greater will be the rate at which the citric acid cakes in the solute container are dissipated. In order to provide an indication of the need to replace the citric acid container, plural hydrometric indicators one of whose specific gravity is less than that of the solution of minimum acceptable concentration of solute in solvent and greater than that of the solvent alone are provided. The other indicator has a specific gravity less than that of a concentrated solution of the solute but greater than that of a solution of minimum acceptable concentration. As more and more of the citric acid cake or cakes are dissolved in the solvent or feed water, the solute concentration in the solute container will eventually begin to drop until the specific gravity of the solution therein has decreased to a point at which the solute concentration is such that one of the indicators will begin to fall, indicating that the need for solute replacement is imminent. When the minimum concentration level is reached, the other indicator will begin to fall and provide a visual indication that satisfactory pH control of distilland is no longer possible without solute replacement.

In consequence of the foregoing, it is an object of this invention to provide a relatively simple and inexpensive system and method for feeding a solute at an accurately and variably predetermined and relatively slow rate (for example, on the order of a fraction of a gram per hour) into a stream of a liquid solvent which may also be flowing at a relatively slow rate (e.g., on the order of a few liters per hour).

It is another object of the instant invention to provide an improved means and method for treating feed water in a distillation system to prevent scaling and other undesirable precipitation within such system.

It is a further object of the present invention to provide a solute feeding system and method having a feed rate of solute to solvent which may be varied by the user as a function of the condition of the solvent.

A still further object of the present invention resides in incorporating means within a boiler used in a water desalination system to prevent mineral precipitation within said system by providing a controlled feeding of solute into the feed water in said boiler at a variable rate which may be chosen by the user as a consequence of the alkalinity of the feed water.

DESCRIPTION OF THE DRAWINGS

Other objects and many of the attendant advantages of the instant invention will be better appreciated and said invention will become clearly understood by reference to the following detailed description when considered in conjunction with the accompanying drawings illustrating one embodiment of the subject invention, wherein:

FIG. 4 provides a broken-away perspective of the solute feed mechanism of the subject invention partly in section;

FIG. 5 provides an enlarged detail section of a portion of the novel solute container of the subject invention;

FIG. 6 provides an enlarged detail of a portion of the invention of FIG. 4 illustrating the method of altering the solute feed rate;

FIG. 7 illustrates the solute concentration indicating mechanism when the solute concentration is a maximum;

FIG. 8 illustrates the solute concentration indicating mechanism when the solute concentration has considerably decreased; and FIG. 9 illustrates the solute concentration indicating mechanism when the solute concentration has dropped below the minimum acceptable level.

DESCRIPTION OF THE PREFERRED EMBODIMENT

Typical applications of the solute metering system of the invention include the introduction over an extended period of time, i.e., days, weeks, or months, of a variably metered amount of solute into a stream of liquid to maintain a predetermined solute concentration level therein. These include, for example, the feeding of a solute into a stream of water for a number of reasons: the solute may be a gas such as chlorine introduced into the water for the purpose of killing or suppressing the activity of biological organisms including bacteria, algae, and the like; a chemical compound serving a medical or health function such as fluoride; or a compound serving another function such as is disclosed in the description of the invention, namely, control of pH.

Additives are frequently introduced into a stream of water intended to be heated to control the pH and prevent the formation in the heat exchange system of scale produced by compounds of calcium, magnesium, iron, etc. For this purpose, the solutes include acids such as sulfuric and hydrochloric in liquid form; and citric acid and sulfonic acid available in crystalline form and frequently compressed into briquettes or cakes which may supply the required pH control for periods of up to several months. Many other applications of the invention in a variety of arts will make themselves apparent and include any application in which it is necessary to add an accurately metered amount of a solute to a stream of solvent. These may range, as previously noted, from pH control to such widely disparate applications as the introduction of additives to food products and the ministration of medicinal compounds by intravenous infusion.

The apparatus and method of the invention, as well as the previous examples of its application, are described with reference to water as the solvent, both for the sake of convenience and more importantly because water is the universal solvent and that most widely used. The particular application disclosed for the purposes of illustration is the introduction of an acid into a water heater and deaerator to control pH and prevent the formation of scale both on the heater surfaces and/or the surfaces of other components contacted by the stream of heated water.

Figure 1:
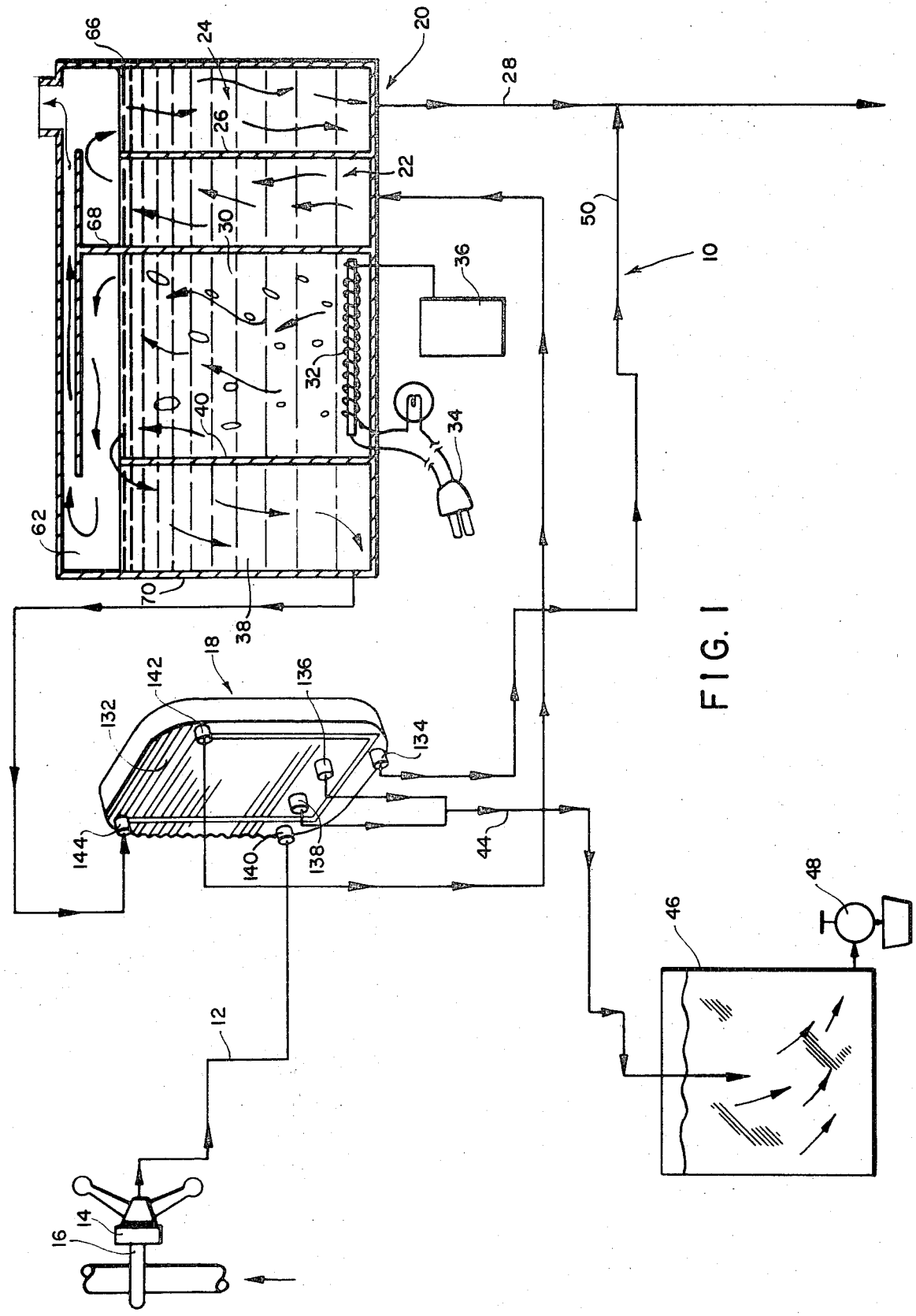
FIG. 1 provides a simplified functional schematic of the subject invention in conjunction with a home distillation system.

Referring to the drawings in more detail, and more particularly to FIG. 1, a typical application of the subject invention is illustrated by a distillation system 10 which is suitable for home use in distilling tap water from a kitchen sink. The distillation system 10 is provided with a water supply line 12 which extends to a line piercing valve 14 which is adapted to connect to a cold water supply line 16 of the kitchen sink (not shown). The water supply line 12 carries cold water from the supply line 16 to the cold water input of a still 18 of the multi-stage type wherein several microporous membranes are arranged in stacked relation with alternating impermeable barrier membranes which cooperate to form channels on opposite sides of each microporous membrane for distilland and distillate liquids such as described hereinabove and more fully described in my copending application Ser. No. 317,624, filed Dec. 22, 1972, and commonly assigned herewith. The still 18 is connected to and receives treated feed water from a water treatment device 20 which is seen to include a first chamber 22 which receives cold water which has been circulated through the still 18 (from the cold water supply line 16). The first chamber 22 is separated from a second chamber 24 by a partition 26 of predetermined height so that water from the first chamber 22 will overflow the partition 26 into the second chamber 24, thereby maintaining the liquid level or pressure head in the water treatment device 20 at the height of the partition 26. The second chamber 24 is connected through a drain line 28 (which functions as a common drain for the distillation system 10) to the sink drain (not shown) thereby preventing the second chamber 24 from filling above the height of the partition 26.

The water treatment device 20 is provided with a third or boiler chamber 30 which communicates with the first chamber 22 (as described in more detail infra) to receive cold feed water therefrom. An electric heating element 32 is disposed within the bottom portion of the boiler chamber 30 and is provided with a cord and plug assembly 34 for connection to a common 110 volt power supply (not shown). The heating element 32 is controlled by a common thermistor control network 36 for safety and extended still life. Should the water supply fail and the boiler chamber 30 run dry, the control network 36 will sense an overheating condition and turn the heating element 32 off. Similarly, a power failure of a duration that would allow the water in the boiler chamber 30 to cool below, e.g., 140°F, would be sensed and the heating element 32 would be shut down until normal start-up procedures were again followed (as described in more detail in copending application Ser. No. 317,623, aforesaid).

The water treatment device 20 is provided with a fourth chamber 38 which is separated from the boiler chamber 30 by a partition 40 of the same height as the partition 26 and over which heated and deaerated water from the boiler chamber 30 flows into the fourth chamber 38 which functions as a feed water or distilland reservoir. The feed water reservoir or fourth chamber 38 is provided with an opening 41 (FIG. 3) which communicates with a fifth chamber 42 (FIGS. 2, 3, and 4), which incorporates the novel solute metering mechanism of the subject invention and controls the pH of the heated feed water in the reservoir 38 via the opening 41, as more fully described infra.

The fourth chamber or reservoir 38 communicates with the still 18 in a manner more fully described infra to provide heated, deaerated, and treated feed water thereto. The vapor of the heated and treated feed water is permitted to pass through the pores of the microporous membranes in the still 18 where it is cooled and condensed by the cold water circulating through the still 18 (from the water supply line 12) and fed from the still 18 to the first chamber 22. The vapour of the treated and heated feed water, which passes through the microporous membranes and is cooled as aforesaid, condenses to form the potable product water and flows through product water channels (not shown) in the still 18 and flows out of the still 18 and through a product water line 44 to a product storage container 46. Potable product water may be withdrawn from the storage container 46 via a simple spigot 48 in a manner well known to the art.

As heated and treated feed water or distilland is circulated through the still 18 and the solvent or distillate is drawn off as potable product water, the solute concentration of the distilland is increased. The distilland with the increased solute concentration comprises the effluent in the distillation process and it is drawn off from the still 18 as blow-down via a blow-down discharge line 50. The blow-down discharge line 50 is, in turn, connected to the common drain 28 so that the effluent from the distillation process may be conveyed to the sink drain (not shown).

Referring again to FIGS. 2 and 3 in more detail, the water treatment device 20 is seen to include a rear housing portion 52 and a forward housing portion 54. The rear housing portion 52 encloses the fifth chamber 42 which is adapted to receive a solute container 56. The solute container 56 is in the general shape of a rectangular parallelepiped and may typically incorporate cakes of citric acid 57 (FIG. 4) therewithin. The container 56 is formed with an end wall 58 incorporating a plurality of nipples 59 formed in the lower portion thereof with each nipple having a semi-permeable membrane 60 (FIG. 5) therewithin, as described in more detail infra. The nature of the membrane 60 is such that when exposed to water in the fifth chamber 42, it will permit such water to diffuse therethrough into the container 56 at a controlled rate to form a citric acid solution and to permit the citric acid solution thus formed to diffuse back into the chamber 42 and thence to the fourth chamber 38 at a controlled rate so as to control the acidity or pH of the water in said reservoir 38.

Figure 2:
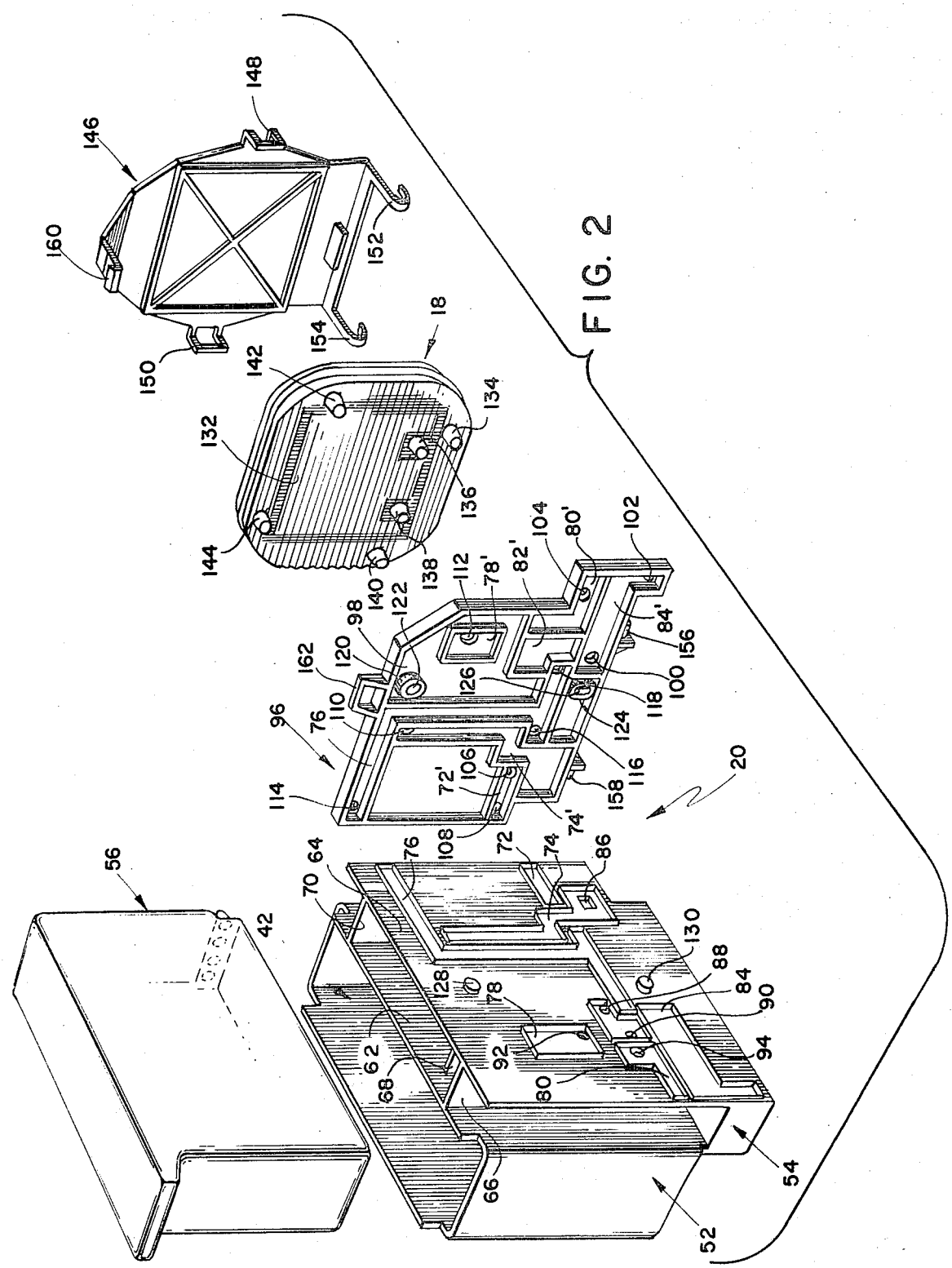
FIG. 2 provides an exploded perspective of the still and the boiler-deaerator device used with the subject invention.
Figure 3:
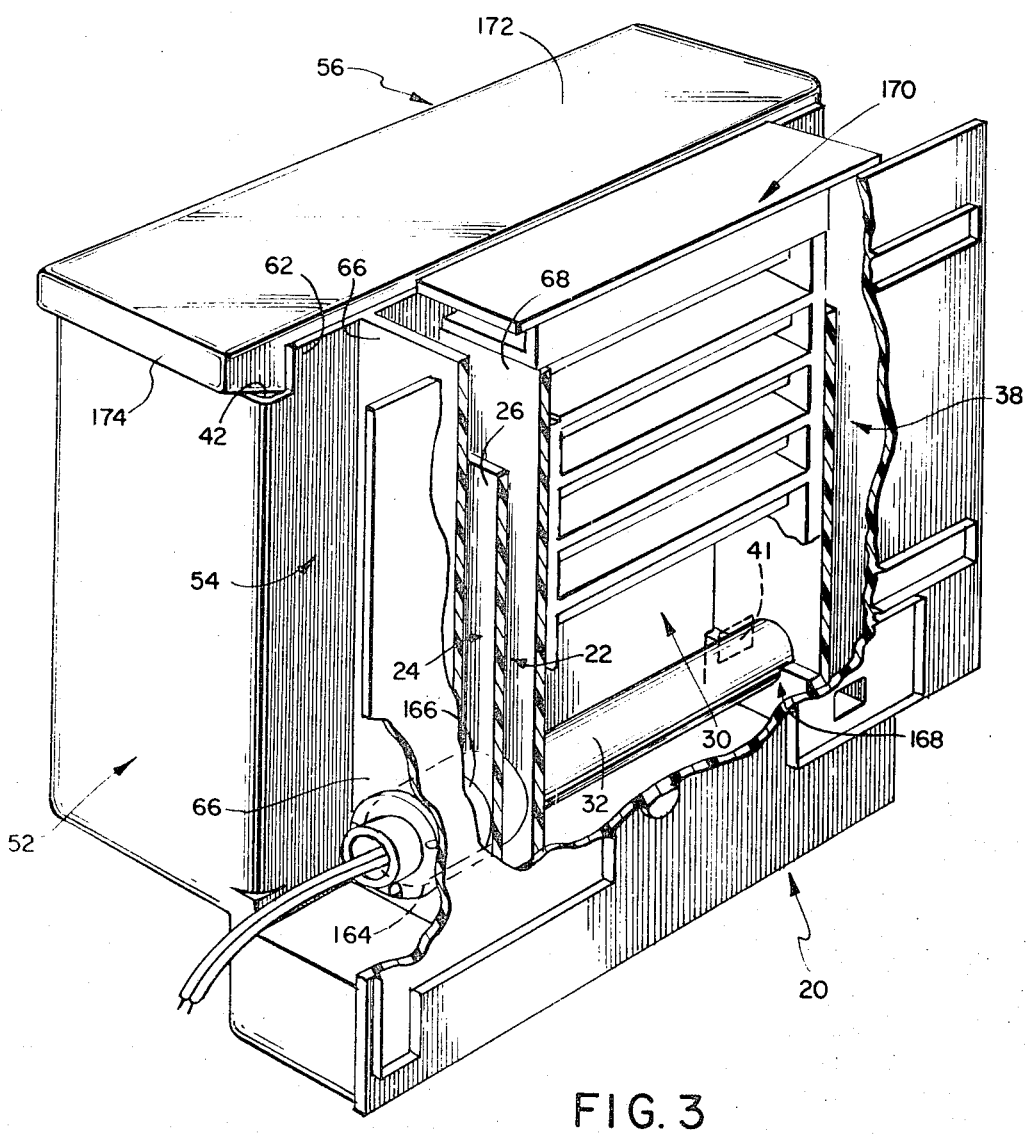
FIG. 3 provides a broken-away perspective of the water treatment device of the subject invention illustrating a portion of the boiler chamber thereof.

As best seen in FIGS. 2 and 3, the fifth chamber 42 is sealed off from the forward housing portion 54 of the unit 20 by a partition wall 62 and communication between the fifth chamber 42 and the fourth chamber 38 occurs via the opening 41 in the partition wall 62, as aforesaid.

As best seen in FIGS. 2 and 3, the chambers 22, 24, 30, and 38 are formed between the partition wall 62 and a spaced, parallel outer wall 64. The second chamber 24 is defined by the partition wall 62, the spaced, parallel outer wall 64, an end wall 66, and the partition wall 26. The first chamber 22 is defined by the partition wall 62, the outer wall 64, the partition 26, and a partition 68. The boiler chamber or third chamber 30 is defined by the partitions 40 and 68 and the walls 62 and 64 and communicates with the first chamber 22, as will be apparent infra. The fourth chamber 38 is defined by the partition 40, the partition wall 62, the outer wall 64, and an end wall 70.

Referring again to FIG. 2, a plurality of open channels are formed integral with the outer face of the wall 64 and are seen to include a coolant water supply channel 72, a distilland supply channel 74, a product water channel 76, a cold water supply channel 78 for the first chamber 22, a cold water overflow channel 80 for the second chamber 24, a cold water supply channel 82, and a blow-down channel 84.

The distilland supply channel 74 is provided with an opening 86 which communicates with the fourth chamber 38 to permit heated and treated distilland to flow from the chamber 38 into the channel 74. Similarly, the cold water supply channel 82 is provides with openings 88 and 90 which communicate with the third or boiler chamber 39 and the first chamber 22, respectively, to permit the cold feed water to enter the boiler chamber 30.

The cold water supply channel 78 is provided with an opening 92 which communicates with the first chamber 22 whereby cold supply water from the channel 78 may be introduced into said first chamber 22. In a like manner, the overflow channel 80 is provided with an opening 94 which communicates with the overflow or second chamber 24 to permit cold water in said chamber 24 to enter said overflow channel 80.

A cover assembly 96 is adapted to mate with the outer wall 64 and includes an inner face 98 having a plurality of open channels formed therein conforming exactly to and in mirror image of the channels formed in the outer wall 64, and which have been identified by the same reference numerals used for the channels in the outer wall 64, save that the channels in the face 98 are distinquished from those in the wall 64 by the notation "prime" ('). The cover assembly 96 is provided with a plurality of openings or ports extending therethrough including a port 100 and a port 102 extending into the channel 84', a port 104 extending into the channel 80', a port 106 extending into the channel 72', a second port 108 extending into the channel 72', a port 110 extending into the channel 74', a port 112 extending into the channel 78', a port 114 extending into the channel 76', and a pair of ports 116 and 118 extending into said channel 76'.

The cover assembly 96 is further provided with a cylindrical boss 120 on its inner face 98 having a cylindrical aligning hole 122 extending therethrough and is further provided with an oblate cylindrical boss 124 having an elongated slot 126 extending therethrough at said inner face 98. The spaced outer wall 64 of the device 20 is provided with a pair of alignment pins 128 and 130 which are adapted to be received within the openings 122 and 126, respectively, in the cover assembly 96, whereby said cover assembly 96 may be mounted over the spaced outer wall 64 with the corresponding open channels in said wall 64 and said face 98 in registration. The elongated slot 126 permits some leeway in mounting the cover assembly 96 on the wall 64 to permit for manufacturing tolerances.

The water treatment device 20 and its cover assembly 96 are constructed of a suitable plastic material (e.g., polysulfone) such that the cover assembly 96 may be sonically welded to the wall 64 whereby the corresponding open channels on the wall 64 and the inner face 98 will seal together to form enclosed channels for conducting fluid and which will be identified hereinafter by the reference numerals utilized to indicate the corresponding open channels in the wall 64. It should be noted that when the cover assembly 96 is sonically welded to the wall 64, a unitary assembly is created with the fluid channels integrally formed therein.

Referring again to FIG. 1, the still 18 is seen to include an inner face 132 which is provided with a plurality of nipples 134, 136, 138, 140, 142, and 144 which function as entrance and exit ports for the various fluids flowing to and from the still 18, as described hereinafter.

The still 18 is adapted to be mounted over the cover assembly 96 with the nipple 134 being received within the port 100 so as to communicate with the channel 84. The nipples 136 and 138 are received within the ports 118 and 116, respectively, and communicate with the channel 76 while the nipple 140 is received within the port 106 and communicates with the channel 72. Similarly, the nipple 142 is received within the port 112 so as to communicate with the channel 78 and the nipple 144 is received within the port 110 so as to communicate with the channel 74.

The still 18 is removably secured over the cover assembly 96 by means of a hinged cover assembly 146. The hinged cover assembly 146 is adapted to snugly fit over the still 18 and is provided with a pair of aligned, spaced tab portions 148 and 150 which are adapted to fit over the lateral surfaces of the still 18. The hinged cover assembly 146 is provided with a pair of spaced, depending hinged members 152 and 154 which are adapted to mount on a pair of spaced, depending pin members 156 and 158, respectively, on the lower edge of the cover assembly 96, whereby the hinged cover assembly 146 may be articulately connected to the cover assembly 96. The hinged cover assembly 146 is further provided with a resilient snap tab 160 on its upper edge which is adapted to releasably engage a mating tab 162 on the upper edge of the cover assembly 96, whereby the hinged cover assembly 146 may be pivoted about the pins 156 and 158 to releasably secure the still 18 to the device 20, sandwiched between said cover assemblies 146 and 96.

Before proceeding, and as best seen in FIG. 3, it should be noted that a cylindrical chamber 164 is formed beneath the chambers 24 and 22 and extends through the end wall 66 and the partitions 26 and 68 such that its upper surface 166 forms the bottom of the chambers 24 and 22 whereby the cylindrical chamber 156 is sealed off from the chambers 24 and 22 and the electrical heating element 32 may be inserted therethrough and extend into the boiler chamber 30 to a support 168.

As best seen in FIG. 3, a baffle network 170 is disposed within the boiler chamber 30 of the device 20 and functions to provide a tortuous path for steam bubbles rising in the chamber 30 such that the bubbles are broken up into smaller size whereby non-condensible gases such as air can be more readily stripped from the feed water being heated in the boiler chamber 30, as more fully described in copending application Ser. No. 317,622, filed Dec. 22, 1972. Referring again to FIG. 4, the solute container 56 is seen to be constructed of a transparent material (such as any suitable plastic) and includes an upper surface 172 which extends to an end portion 174 which, when the solute container 56 is disposed within the fifth chamber 42 of the device 20, is adapted to overhang the rear housing portion 52 to provide a viewing window the function of which will be more apparent infra.

A pair of hydrometric indicators 176 and 178 are disposed within the solute container 156 and each includes a generally rectangular end portion 180 and 182, respectively, disposed within the viewing window end portion 174, and a thin pencil-like tail member 184 and 186, respectively, which extends from the rectangular end portions 180 and 182, respectively, toward the end wall 58.

The rectangular end portions 180 and 182 are constructed of a material having a specific gravity less than that of pure water. The tail members 184 and 186, however, are constructed of a material having a specific gravity greater than that of pure water but less than that of a predetermined minimum concentration of a solute such as citric acid in a solvent such as pure water, with the specific gravity of the material comprising the tail member 184 exceeding that of the material comprising that of the tail member 186 by a predetermined amount for reasons which will be more apparent infra.

As best seen in FIGS. 4, 5, and 6, each of the nipples 59, formed in the bottom portion of the end wall 58, extend from a sealed end face 188 to an end portion 190 which communicates with the interior of the solute container 56 via a semi-permeable membrane 60. Each of the nipples 59 is provided with its own discrete membrane 60 which may be sealed to the nipple 59 at its end portion 190 as by a nitril rubber adhesive such as that sold by B. F. Goodrich under the designation A 1060B.

Microporous material suitable for the membranes 60 are now well known in the art and include polymeric films having microscopic through pores dimensioned to permit the flow of liquids by diffusion in the absence of a substantial hydrostatic pressure differential between the liquids in contact with opposite sides of the membrane.

The membrane and the walls of the pores thereof should, of course, be wettable by the particular solvent, e.g., water, so that the membrane pores will fill with the solvent when the membrane is contacted thereby. A typical membrane used in the apparatus of the invention and its method manufacture is described, for example, in U.S. Pat. No. 3,642,668. This particular membrane is formed of polyvinylidene fluoride, has a thickness ranging from 4.5 to 6.5 mils., and the majority of the pores, e.g., 75 to 80 percent, have a pore diameter range of from 0.5 microns to 3.0 microns with less than about 5 percent of the pores having a diameter greater than 2.0 microns.

This particular membrane material is substantially non-wettable by water and is made wettable by contacting the membrane with an aqueous solution of a lower alcohol such as methanol and then maintaining the membrane in contact with water so that it does not become dry and resume its non-wettable condition. Many other suitable membranes and membrane materials are well known in the art and commercially available. These include membranes formed of polymers normally wettable by water, including cellulose acetate, cellulose triacetate, methyl cellulose, nylon, polyvinyl chloride, polycarbonates. The particular membrane given in the example is selected for its limited pore size distribution, its inertness to and compatibility with numerous chemical compounds, particularly acids, and its mechanical properties, particularly its ability to withstand heat (inasmuch as it is in contact at least on one side with water at an elevated temperature, for example, the boiling point of water).

As previously noted, the structure and method illustrated are designed to introduce citric acid into a reservoir of water. The acid in the cake form 57 may be formed from crystals which are agglomerated or compressed prior to insertion into the container 56.

Referring again to FIGS. 1 and 2, it can be seen that upon connection of the line piercing valve 14 to the cold water supply line 16, the line piercing valve 14 may be opened to permit coolant water to flow to the still 18 via the supply line 12. The coolant water flowing through the supply line 12 will be fed to the coolant water supply channel 72 via the port 108 and flow through said channel 72 into the still 18 via the port 106 and the nipple 140 received therewithin. The coolant water supply will flow through the still 18 where it will function to cool and condense the distilled product water while being shielded from contact therewith and will exit from the still 18 via the nipple 142 through the port 112 into the channel 78. The cold water in the channel 78 will enter the first chamber 22 of the water treatment device 20 via the opening 92 in the wall 64. The first chamber 22 will fill with the cold supply water to a level at which the water begins to spill over the partition 26 into the second chamber 24 and the overflow cold water supply in the chamber 24 will exit therefrom via the opening 94 into the channel 80, and will exit from the channel 80 via the port 104 and the common drain 28.

The cold water supply in the chamber 22 is permitted to exit therefrom via the opening 90 into the channel 82 and thence through the opening 88 into the boiler chamber 30 where it is heated and deaerated as aforesaid. The heated and deaerated supply from the boiler chamber 30 overflows the partition 40 which functions to assure that only water from the top of the boiler chamber 30 comes into the fourth chamber 38 and, hence, that the water entering the reservoir chamber 38 will be more thoroughly deaerated. The heated distilland in the reservoir chamber 38 will communicate with the fifth chamber 42 via the opening 41 (FIG. 3) as described hereinabove.

It should be emphasized at this point that the user will have determined the pH of the cold water supply from the line 16, as by means of suitable indicating means such as litmus paper, and will have determined the degree to which the pH should be altered to prevent scale formation in the unit. Further, as mentioned previously, the solute flow rate across a membrane such as the membrane 60 is a function of the relative concentrations of solute in solvent on both sides of the membrane, the membrane pore size, and the membrane area.

Thus, having determined whether a small or a large rate of solute feed will be necessary to adequately alter the pH of the supply water, the user will proceed to snip off the sealed end surfaces 188 of one or more of the nipples 59 so as to increase the total area of the membranes 60 in contact with the heated and deaerated feed water reaching the fifth chamber 42, from the reservoir chamber 38, and the greater the solute feed rate desired the greater will be the number of nipples 59 snipped.

The water entering the chamber 42 will exert very little hydrostatic pressure on the membranes 60 (at most a few inches depending on the level of the water in the reservoir chamber 38 and the first chamber 22) and will diffuse through the membranes 60 of the opened nipples 59 into the container 56 whereupon the acid cake or cakes 57 will commence to dissolve in the water entering the container 56. The acid solution thus formed will diffuse back through the membranes 60 of the open nipples 59 into the chamber 42 and thence through the opening 41 into the reservoir chamber 38.

From the foregoing, it will be appreciated that the process involves diffusion of water in one direction through the membranes and diffusion of acid in the opposite direction so that while it is possible to start up the process simply by inserting the solute container 56 (with the appropriate number of nipples opened) into the chamber 42, which is receiving heated and deaerated feed water from the reservoir chamber 38, it may be desirable to add at least enough water to the container 56 to initially establish a liquid level such that the feed side of the membranes is in contact with the acid solution.

At this point it should be noted that when the container 56 fills with water from the chamber 42, the liquid level therein (which is up to the top or upper surface 172 of the container 56) will be slightly above that within the reservoir chamber 38 and this is advantageous inasmuch as there may be an osmotic effect tending to increase the head on the feed side of the membrane to equalize the slight osmotic pressure difference even though the membrane does not function primarily as an osmotic membrane.

When the container 56 initially fills with water from the reservoir chamber 38, the citric acid cake 57 will begin to dissolve therein, forming a strongly concentrated solution of citric acid within the container 56. At this time, both of the hydrometric indicators 176 and 178 will be floating in the acid solution and extending adjacent the upper surface 172 of the container 56 such that their rectangular end portions 180 and 182 (which may be brightly colored for easier visual identification) will be fully visible in the window 174, as best seen in FIG. 7.

As the distillation process continues and acid continues to be fed from the solute container 56 through the nipples 59 and the opening 41 to the feed water reservoir 38, the acid cake 57 will continue to dissolve until it has all gone into solution.

During the time that the acid cake 57 is dissolving, the acid solution within the container 56 will remain generally constant and will start to decrease after the cake has been fully dissolved. When the acid concentration within the solute container 56 has reached a concentration at which the feed rate of acid from the container 56 to the feed water reservoir 38 will no longer be sufficient to adequately alter the pH of the feed water in the reservoir 38, it is desirable that the user be made aware of this condition. Accordingly, the specific gravity of the pencil-like tail mamber 184 of the hydrometric indicator 176 is made greater than that of the tail member 186 such that when a predetermined level of acid concentration in the container 56 is reached (a sufficiently strong acid concentration point is chosen to permit the system to function adequately for a reasonable time after such point is reached such that the user can take appropriate action) whereby the tail member 184 now being of greater specific gravity than that of the acid solution in the container 56 will begin to drop (as illustrated in FIG. 4) such that as best seen in FIG. 8 the rectangular end portion 180 of the hydrometric indicator 176 will rotate to present its relatively narrow edge portion 192 to the user as viewed through the window 174. At this time, the user has been given a visual indication that it is time to either replace the container 56 or recharge it with acid.

In the embodiment of the invention illustrated herein, it is contemplated that the user will merely discard the entire container 56 and replace it with a new one. At such time as the acid concentration in the container 56 falls below that level necessary to adequately control the pH of the feed water in the reservoir 38, its specific gravity will have decreased to a point below the specific gravity of the tail portion 186 (which, it will be recalled, has a lower specific gravity than the tail portion 184). At this time, the tail portion 186 of the hydrometric indicator 178 will begin to fall in the container 56 (as indicated in FIG. 4) and the rectangular end portion 182 will rotate to present its relatively narrow edge portion 194 to the user as viewed through the window 174 and as best illustrated in FIG. 9. At such time, the user has been given a visual indication that the acid concentration within the solute container 56 has now fallen below that level at which the pH in the reservoir 38 can be adequately controlled and that any further operation of the distillation system 10 without replacing the solute container 56 can result in scale formation and mechanical malfunction.

As previously noted, the solute feed metering system may be employed with solutes in gaseous and liquid forms as well as with solutes in solid form. In the case of a liquid solute such as sulfuric acid or hydrochloric acid, the container 56 may be filled with the concentrated acid to approximately the level of the water in the reservoir chamber 38. Although water diffusion through the membrane and within the acid may tend to dilute the acid, such dilution will be very slight and at a very slow rate; and because of its greater specific gravity, concentrated acid will tend to remain within the lowermost portiion of the container 56 so that the concentration of the acid at the feed side of the membranes 60 will remain substantially constant. In such applications, it may be necessary after a period of use to add additional acid to the container 56 and, perhaps, withdraw some of the less concentrated acid.

In the case of a gaseous solute such as chlorine, the container 56 will contain water, or other solvent for chlorine, and will be configured such that the gas can be introduced under controlled pressure. The concentration of the gas in the solvent then can be maintained constant, being dependent upon the hydrostatic pressure. Of course, the head or hydrostatic pressure on the solvent stream side should be adjusted to prevent any rupture of the membrane and/or flow of liquid under pressure.

In embodiments in which the solute is introduced in liquid or gaseous form, it may be helpful to maintain the concentration of the solute in the liquid in the region of the feed side of the membrane more constant by providing means within the container 56 for circulating the liquid within the container (so that the solution in contact with the membranes 60 is constantly being changed or replaced). Such means may take the form of a single agitation device of a conventional type located within the solute container 56 and is particularly desirable in a case where the solute is a gas under pressure dissolved in the solvent.

Returning to a consideration of the operation of the system 10, the heated, deaerated, and pH controlled feed water from the reservoir chamber 38 will exit therefrom via the opening 86 and flow through the channel 74 to the nipple 144 which communicates with the channel 74 via the port 110 and serves as the entrance to the still 18 for the heated and treated distilland.

The distilland entering the still 18 from the nipple 144 will be fed simultaneously to the multi-stages thereof and will flow on one side of successive microporous membranes through which its vapor will pass and be condensed by the coolant water supply circulating through the still 18, as aforesaid. It should be emphasized that the heated distilland and the cooled product water are isolated by the microporous membranes in any individual stage and by non-porous barrier membranes between successive stages. The heated distilland circulating through the still 18 is withdrawn therefrom via the nipple 134 which communicates with the channel 84 via the port 100. The spent distilland or blowdown may be withdrawn from the channel 84 via the port 102 which communicates with the blow-down discharge line 50 and the common drain 28.

Potable product water may be withdrawn from the still 18 via the nipples 136 and 138 which communicate with the channel 76 via the ports 118 and 116, respectively. The potable product water entering the channel 76 is withdrawn therefrom via the port 114 which communicates via the product water line 44 with the product storage container 46.

It can readily be seen that many other variations and modifications of the present invention are possible in the light of the foregoing teachings, and it will be apparent to those skilled in the art that various changes in form and in arrangement of components may be made to suit requirements without departing from the spirit and scope of the invention. It is, therefore, to be understood that within the scope of the appended claims, the instant invention may be practised in a manner otherwise than is specifically described herein.

What is claimed is:

1. Apparatus for feeding a solute into a solvent, including:
   solvent holding means;
   solute holding means;
   means for communicating liquid between said holding means;
   membrane means having microscopic through pores disposed in closing relation across said communicating means such that it may contact said solvent on one side and a solution of said solute on the opposite side; said membrane pores being filled with a liquid including said solvent for permitting said solvent and said solute solution to diffuse through said membrane; and
   means for varying the area of said membrane means that may be brought in contact with at least one of said solute solution and solvent to vary the rate of diffusion of a solution of said solute through said membrane means; said area varying means includes frangible means for shielding a predetermined area of membrane surface from said solvent, whereby said frangible shielding means may be broken open to provide a predetermined change in the rate at which said solute solution may be fed to said solvent holding means, said frangible means for shielding including a plurality of nipple-like structures each having a sealed end communicating with said solvent and in communication with the solution of said solute via said membrane means, whereby said solvent and said solute solution may diffuse through said membrane means at a controlled rate as a function of the number of sealed nipple-like ends which are opened 2. The invention as recited in claim 1, wherein the hydrostatic pressure of the solvent on one side of said membrane means approximates the hydrostatic pressure of the solute solution on the other side thereof.

3. The invention as set forth in claim 2, further including means for maintaining the solute concentration on one side of said membrane means generally constant.

4. The invention according to claim 3, wherein said concentration maintaining means includes a quantity of excess solute other than in solution with said solvent, whereby said excess solute may enter into solution with said solvent to maintain the solute solution concentration as said solute solution diffuses through said membrane means to said solvent holding means and said solvent diffuses through said membrane means to said solute holding means.

5. The invention in accordance with claim 4, further including means disposed within said solute holding means for indicating the solute concentration in the solute solution therein.

6. The invention as recited in claim 5, wherein said solute holding means includes transparent means for viewing said solute concentration indicating means.

7. The invention as delineated in claim 6, wherein said solute concentration indicating means includes a hydrometric indicator.

8. The invention as set out in claim 7, wherein said solute in said holding means is at least partly in solid from.

9. The invention as stated in claim 8, wherein said solute in said solute container is initially in solid form and subsequently enters into solution with said solvent upon diffusion of said solvent into said solute container.

10. The invention as recited in claim 1, wherein said membrane means comprises a plurality of discrete membranes each disposed in a distinct one of said nipples.

* * * * *